UNITED STATES PATENT OFFICE.

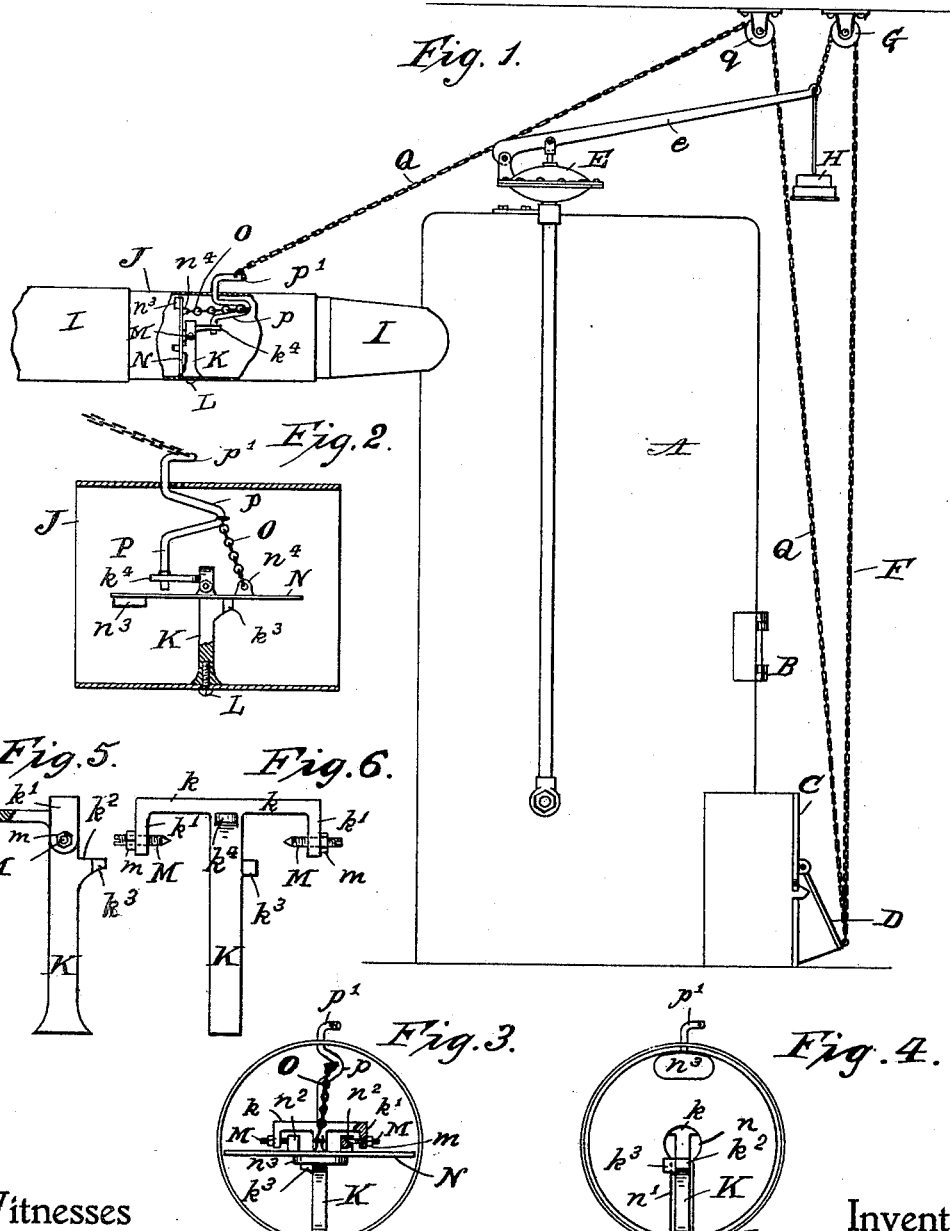

ROBERT G. LATHAM, OF MANCHESTER, NEW HAMPSHIRE.

DAMPER.

SPECIFICATION forming part of Letters Patent No. 697,258, dated April 8, 1902.

Application filed October 8, 1900. Serial No. 32,420. (No model.)

*To all whom it may concern:*

Be it known that I, ROBERT G. LATHAM, a citizen of the United States, residing at Manchester, in the county of Hillsboro and State of New Hampshire, have invented certain new and useful Improvements in Dampers; and I do hereby declare the following to be a full, clear, and exact description of the invention, such as will enable others skilled in the art to which it appertains to make and use the same.

This invention relates to dampers for house-heating boilers; and the object of the invention is to provide a damper which will operate freely without liability of sticking in its bearings or becoming clogged with soot.

The invention consists, essentially, in providing such a damper pivoted centrally to a standard or support secured within the smoke-flue, together with other features of construction to be fully set forth in the following specification and claims, and clearly illustrated in the drawings accompanying and forming a part of the same, of which—

Figure 1 illustrates a house-heating boiler having a smoke-flue, within the broken portion of which is shown my improved damper in proper operative relation. Fig. 2 is an enlarged longitudinal sectional elevation showing the reverse side of my improved damper mounted in a section of the smoke-flue. Fig. 3 is an end view of a smoke-flue, showing my improved damper as when open. Fig. 4 is a similar view showing the damper closed, Figs. 5 and 6 being detail views of my improved vertical standard or damper-support.

Similar reference-letters designate corresponding parts in all the views.

A represents a house-heating boiler. B is its feed-door.

C is the door to the ash-pit, and D is the draft-plate pivotally attached to said ash-pit door, said plate D being connected in the ordinary manner to the lever $e$ of a diaphragm E by a chain F, passing from said draft-plate over a pulley G to the free end of the lever $e$, as shown in Fig. 1, and to which lever may be attached suitable weights H.

I is a smoke-flue, in which is provided a short section J, within which is mounted my improved damper. Within the section J is secured by a screw L a vertical standard K, substantially of the form shown in the drawings, having a cross-bar $k$ at its free end provided with ears $k'$, having threaded perforations to which are fitted the cone-pointed screws M, forming adjustable bearings for my improved damper N. Said damper has a central perforation $n$ and a radial opening $n'$ of sufficient width to straddle the standard K, said opening $n'$ terminating in the perforation $n$, as shown. Other perforations may be provided in the damper for the ready escape of gas, if desired.

At opposite sides of the central opening $n$ are provided ears $n^2 n^2$, provided with recesses in which are adjusted the cone-pointed screws M, by which the damper is supported.

I do not intend to limit my invention to a damper having cone-pointed bearings, since bearings of any sort are within the spirit thereof; nor do I intend to limit myself to the precise form of standard shown. Any radial standard and any bearing adapted to support the damper centrally thereof are within the scope of my invention.

The damper is supplied with a counterweight $n^3$ at the proper point to hold it normally open, and an ear $n^4$ is also provided, by which the damper may be connected by a chain O with a crank $p$, formed upon a bar P for closing the same.

The standard K has suitable stops $k^2 k^3$ for properly limiting the movement of the damper, respectively, when open and closed, and it is also provided with an arm $k^4$, in which the lower end of the crank-bar P finds its bearing, the other bearing for the crank-bar being in the smoke-flue, as shown. The outer end of said crank-bar is provided with an arm or bent at a right angle, as seen at $p'$, and to this arm is attached one end of a cord or chain Q, which passes over a pulley $q$ and is attached at its opposite end to the draft-plate at $d$, as shown.

By providing the screws M with a checknut $m$ the damper may be readily adjusted to run very freely without liability of becoming so loose as to strike the interior of the pipe and stick.

The advantage of my improved damper over the ordinary construction is that it is mounted upon cone-points or other suitable bearings wholly within the smoke flue or pipe and operated by a chain and crank, both of which are also located within the pipe and almost entirely free from friction, the counterweight $n^3$ being only sufficient to avoid any slack in the chain Q and to permit the damper to open as fast as and in unison with the draft-plate when the latter is opened by the action of the lever $e$ of the diaphragm E.

Having described my improvements, what I claim is—

1. In a stove or furnace funnel, a radial standard secured interiorly and extending to a point near the radial center of said funnel, a damper having a radial opening adapted to straddle said standard and pivotally connected to the latter a crank and flexible connection for the same to said damper and within said funnel, and means for operating said crank and damper upon the outside of said funnel.

2. A damper having a central perforation and a radial opening connecting said perforation with its periphery, ears located one at each side of said perforation, a vertical standard or support secured and extending to a point near the radial center of and within a smoke pipe or funnel and pivotally connected to the ears of said damper, a bar having a crank interior and exterior of said funnel, and a suitable flexible connection between the interior crank and the said damper.

3. In a stove or furnace funnel, a radial standard secured interiorly of and extending to a point near the radial center of said funnel, a damper pivotally connected to said standard, a crank within said funnel, a crank-bar therefor pivoted to the standard and to the funnel, flexible connection between the crank and the damper adapted to operate the latter, and means for operating the crank upon the outside of the funnel.

4. In a smoke-funnel, a damper provided with a radial opening terminating at its center and lateral countersunk ears located one at each side of said opening, a vertical standard secured at one end to said funnel and provided with threaded perforations at opposite sides of its free end, screws threaded to the perforations in said standard and having cone-points adapted to bear in the counter-ears of said damper, and a vertical bar having bearings in said funnel and standard and provided with a crank between its bearings and a crank outside of said funnel, and a chain connecting the inner crank with said damper.

5. In a stove or furnace funnel, a radial standard secured interiorly of and extending to a point near the radial center of the funnel, and provided with a lateral arm, a damper centrally pivoted to said standard, a crank within said funnel, a crank-bar therefor, having its bearings in said lateral arm of the standard and in the funnel, flexible connection between the crank and the damper adapted to operate the latter, and means for operating the crank upon the outside of the funnel.

In testimony whereof I affix my signature in presence of two witnesses.

ROBERT G. LATHAM.

Witnesses:
J. B. THURSTON,
EMILE H. TARDIVEL.